(12) United States Patent
Kawauchi

(10) Patent No.: US 11,541,692 B2
(45) Date of Patent: Jan. 3, 2023

(54) TYRE

(71) Applicant: SUMITOMO RUBBER INDUSTRIES, LTD., Hyogo (JP)

(72) Inventor: Yasunori Kawauchi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 567 days.

(21) Appl. No.: 16/656,995

(22) Filed: Oct. 18, 2019

(65) Prior Publication Data

US 2020/0139765 A1    May 7, 2020

(30) Foreign Application Priority Data

Nov. 2, 2018 (JP) .............................. JP2018-207562

(51) Int. Cl.
*B60C 11/01* (2006.01)
*B60C 11/11* (2006.01)
(Continued)

(52) U.S. Cl.
CPC .......... *B60C 11/01* (2013.01); *B60C 11/0306* (2013.01); *B60C 11/11* (2013.01);
(Continued)

(58) Field of Classification Search
CPC ..... B60C 11/01; B60C 11/11; B60C 11/1204; B60C 11/1236; B60C 11/0306; B60C 13/02; B60C 2011/0365
(Continued)

(56) References Cited

U.S. PATENT DOCUMENTS

2002/0011293 A1* 1/2002 Zanzig ...................... C08L 7/00
                                                              152/209.16
2018/0065415 A1* 3/2018 Sakamoto ............... B60C 11/01
(Continued)

FOREIGN PATENT DOCUMENTS

DE     11 2017 00400        10/2018
EP          0 640 498         3/1995
(Continued)

OTHER PUBLICATIONS

Extended European Search Report, European Patent Office, Application No. 19205644.8, dated Feb. 17, 2020.

*Primary Examiner* — Katelyn W Smith
*Assistant Examiner* — Philip N Schwartz
(74) *Attorney, Agent, or Firm* — Greenblum & Bernstein, P.L.C.

(57) ABSTRACT

A tyre includes a tread portion including a shoulder land portion which has a tread edge and an axial outer surface extending radially inwardly from the tread edge. The shoulder land portion is provided with shoulder lateral grooves extending inwardly in the tyre axial direction from the tread edge to define shoulder blocks therebetween, and protrusions protruding outwardly in the tyre axial direction from the outer surface. The protrusion includes first protrusions each provided on the respective shoulder blocks and extending in the tyre radial direction, and second protrusions connecting radially inner ends of adjacent two first protrusions such that first bent portions are formed between the second protrusions and the first protrusions. The first protrusions have widths smaller than maximum length in the tyre circumferential direction of the respective shoulder blocks, and the second protrusions have widths smaller than the width of the first protrusions.

18 Claims, 5 Drawing Sheets

(51) Int. Cl.
   *B60C 11/12* (2006.01)
   *B60C 11/03* (2006.01)
(52) U.S. Cl.
   CPC ...... *B60C 11/1204* (2013.01); *B60C 11/1236* (2013.01); *B60C 2011/0365* (2013.01); *B60C 2011/1209* (2013.01); *B60C 2011/1213* (2013.01); *B60C 2200/14* (2013.01)
(58) Field of Classification Search
   USPC ...................................................... D12/605
   See application file for complete search history.

(56) References Cited

U.S. PATENT DOCUMENTS

| | | | |
|---|---|---|---|
| 2019/0016179 A1* | 1/2019 | Yamakawa | ......... B60C 11/1236 |
| 2019/0176531 A1 | 6/2019 | Murata | |

FOREIGN PATENT DOCUMENTS

| | | | | |
|---|---|---|---|---|
| EP | 1 033 265 | 9/2000 | | |
| JP | H07-276917 | 10/1995 | | |
| JP | 6142930 B1 * | 6/2017 | ............. | B60C 11/01 |
| JP | 2017-213926 A | 12/2017 | | |

\* cited by examiner

TYRE

BACKGROUND ART

Field of the Disclosure

The present disclosure relates tyres, more particularly to a tyre for driving on off-road.

Description of the Related Art

Conventionally, various types of tyres which are suitable for driving on off-road such as snowy and muddy roads have been proposed. For example, the following Patent document 1 discloses a pneumatic tyre which includes a tread portion provided with a plurality of shoulder blocks provided on the side surfaces with side blocks in order to improve driving performance on muddy roads.

Patent Document

[Patent Document 1]
Japanese Unexamined Patent Application Publication 2017-213926

SUMMARY OF THE DISCLOSURE

Unfortunately, since the tyre disclosed in Patent document 1 has larger side blocks, the tyre tends to exhibit imbalance when high speed driving.

The present disclosure has been made in view of the above problem and has a major object to provide tyres capable of improving traction on off-road and tyre balance (e.g. dynamic tyre balance) when high speed driving.

According to one aspect of the disclosure, a tyre includes a tread portion including a shoulder land portion, the shoulder land portion having a tread edge and an outer surface in a tyre axial direction extending inwardly in a tyre radial direction from the tread edge, the shoulder land portion being provided with shoulder lateral grooves extending inwardly in the tyre axial direction from the tread edge to define shoulder blocks therebetween, and protrusions protruding outwardly in the tyre axial direction from the outer surface of the shoulder land portion, the protrusion including first protrusions each provided on the respective shoulder blocks and extending in the tyre radial direction, and second protrusions connecting inner ends in the tyre radial direction of adjacent two first protrusions in a tyre circumferential direction such that first bent portions are formed between the second protrusions and the first protrusions, wherein the first protrusions have widths smaller than maximum length in the tyre circumferential direction of the respective shoulder blocks, and wherein the second protrusions have widths smaller than the width of the first protrusions.

In another aspect of the disclosure, the widths of the second protrusions at first locations located inwardly of the respective shoulder lateral grooves in the tyre radial direction may be in a range of from 40% to 80% of the widths of the first protrusions.

In another aspect of the disclosure, the second protrusions each may have an angle of from 10 to 65 degrees with respect to the tyre radial direction at the first locations.

In another aspect of the disclosure, in each first bent portion, an angle between the second protrusion and the first protrusion may be an obtuse angle.

In another aspect of the disclosure, each second protrusion may further include at least one second bent portion.

In another aspect of the disclosure, the widths of the first protrusions may be each in a range of from 20% to 50% of the maximum widths in the tyre circumferential direction of the respective shoulder blocks.

In another aspect of the disclosure, an angle of each first protrusion may be equal to or less than 10 degrees with respect to the tyre radial direction.

In another aspect of the disclosure, in a tyre cross-section perpendicular to the outer surface of the shoulder land portion and along the tyre circumferential direction, a pair of side surfaces of each first protrusion may be inclined at an angle equal to or less than 45 degrees with respect to a normal line to the outer surface of the shoulder land portion.

In another aspect of the disclosure, each protrusion may have a protruding height in a range of from 1.5 to 5.0 mm from the outer surface of the shoulder land portion.

In another aspect of the disclosure, the protrusions may not be provided with any grooves nor sipes.

In another aspect of the disclosure, the shoulder lateral grooves may include first shoulder lateral grooves whose inner regions in the tyre radial direction are provided with the second protrusions, and second shoulder lateral grooves whose inner regions in the tyre radial direction are not provided with the second protrusions, and wherein the first shoulder lateral grooves and the second shoulder lateral grooves may be arranged alternately in the tyre circumferential direction.

In another aspect of the disclosure, each shoulder lateral groove may have a groove width increasing gradually outwardly in the tyre axial direction.

DESCRIPTION OF THE PREFERRED EMBODIMENTS

An embodiment of the present disclosure will be explained below with reference to the accompanying drawings.

Figure 1:
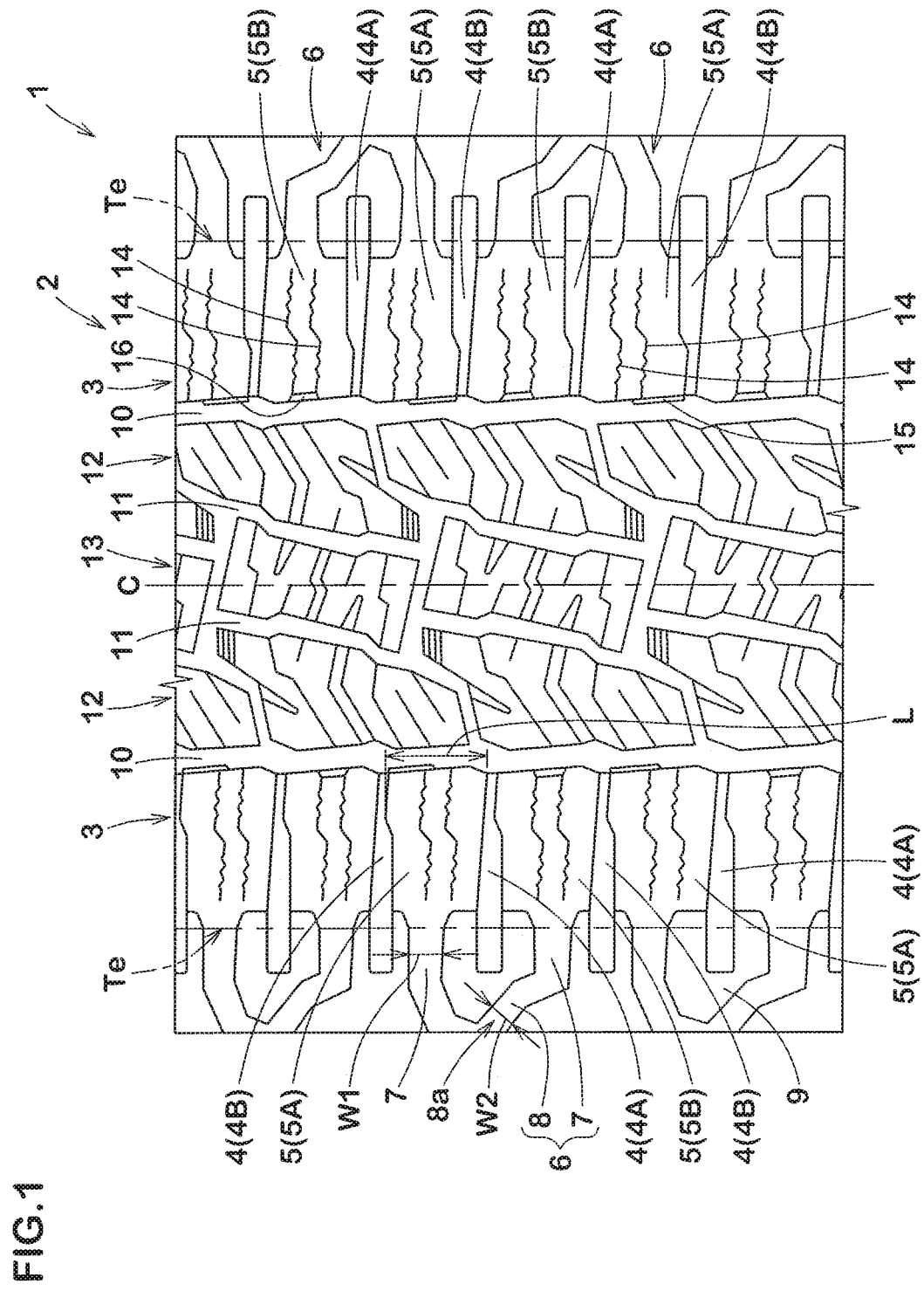
FIG. 1 is a development view of a tread portion of a tyre in accordance with an embodiment of the present disclosure.

FIG. 1 illustrates a development view of a tread portion 2 of a tyre 1 according to an embodiment of the disclosure.

As illustrated in FIG. 1, the tyre 1 according to the present embodiment is used suitably as a pneumatic tyre for driving on snowy and muddy roads.

The tread portion 2 according to the present embodiment includes two shoulder land portions 3 each include a respective one of tread edges Te.

As used herein, the tread edges Te are defined as axially outermost edges of the ground contacting patch of the tread portion 2 which occurs under a normal state with a standard tyre load when the camber angle of the tyre is zero. Note that the center position in the tyre axial direction between the tread edges Te is defined as the tyre equator C.

As used herein, the "normal state" is such that the tyre 1 is mounted on a standard wheel rim with a standard pressure but loaded with no tyre load. As used herein, unless otherwise noted, dimensions of respective portions of the tyre 1 are values measured under the normal state.

The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The "standard tyre load" is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

The shoulder land portions 3 according to the present embodiment are provided with a plurality of shoulder lateral grooves 4 extending inwardly in the tyre axial direction from the respective one of the tread edges Te to define a plurality of shoulder blocks 5 therebetween. Such shoulder land portions 3, when driving on off-road, can dig the shoulder blocks 5 into the off-road, improving traction performance of the tyre 1.

Figure 2:
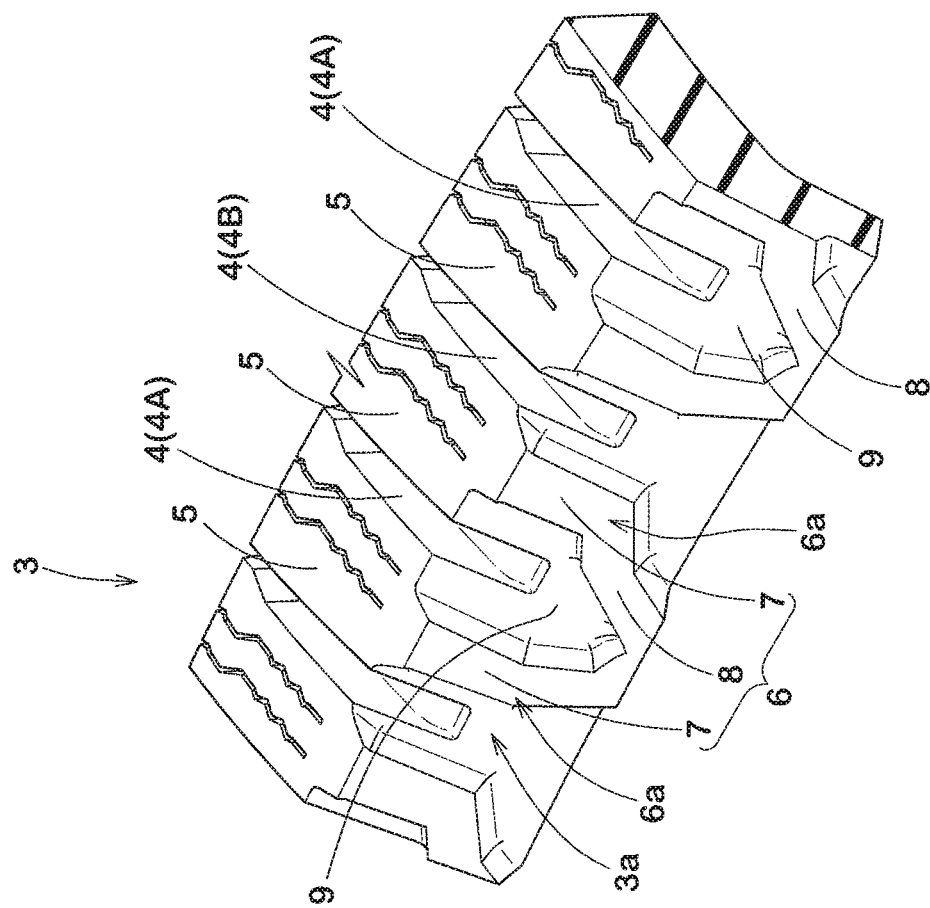
FIG. 2 is a perspective view of a shoulder land portion.

FIG. 2 illustrates a perspective view of one of the shoulder land portions 3. As illustrated in FIG. 1 and FIG. 2, each shoulder land portion 3 has an outer surface 3a in the tyre axial direction extending inwardly in the tyre radial direction from the tread edge Te. Preferably, the outer surface 3a of the shoulder land portion 3 is provided with protrusions 6 protruding outwardly in the tyre axial direction. When driving on off-road, the protrusions 6 can enter the off-road, enabling to improve traction performance of the tyre 1.

The protrusions 6 according to the present embodiment include first protrusions 7 provided on the respective shoulder blocks 5 and extending in the tyre radial direction, and second protrusions 8 connecting inner ends in the tyre radial direction of adjacent two first protrusions 7 in the tyre circumferential direction such that first bent portions 6a are formed between the second protrusions 8 and the first protrusions 7. Such protrusions 6, upon entering off-road, generate powerful traction, further improving traction performance of the tyre 1 when off-road driving. It is preferable that each first protrusion 6 extends outwardly in the tyre radial direction to the tread edge Te.

As illustrated in FIG. 1, it is preferable that widths W1 of the first protrusions 7 are smaller than maximum lengths L in the tyre circumferential direction of the respective shoulder blocks 5. In addition, it is preferable that widths W2 of the second protrusions 8 are smaller than the widths W1 of the first protrusions 7. Such protrusions 6 may provide small volume thereof, offering better tyre balance when high speed driving of the tyre 1. Thus, the tyre 1 according to the present embodiment can compatible powerful traction performance on off-road with better tyre balance when high speed driving.

In some preferred embodiments, the widths W1 of first protrusions 7 are in a range of from 20% to 50% of the maximum lengths L of the respective shoulder blocks 5. When the widths W1 are less than 20% of the maximum lengths L, traction performance on off-road may not be improved due to lack of stiffness of the first protrusions 7. When the widths W1 are greater than 50% of the maximum lengths L, the tyre balance when high speed driving may not be improved due to a large volume of the first protrusions 7.

It is also preferable that the widths W1 of the first protrusions 7 are greater than groove widths of the shoulder lateral grooves 4, thus improving traction performance on off-road of the tyre 1.

It is preferable that the widths W2 of the second protrusions 8 at first locations 8a located inwardly of the respective shoulder lateral grooves in the tyre radial direction are in a range of from 40% to 80% of the widths W1 of the first protrusions. When the widths W2 are less than 40% of the widths W1, traction performance on off-road may not be improved due to lack of stiffness of the first protrusions 7. When the widths W2 are greater than 80% of the widths W1, the tyre balance when high speed driving may not be improved due to a large volume of the first protrusions 7. It is also preferable that each second protrusion 8 has a minimum width smaller than groove widths of the shoulder lateral grooves 4. This makes it possible to discharge effectively mud and the like clogged in a plurality of side pockets 9 each of which is surrounded by two first protrusions 7 and one second protrusion 8.

Figure 3:
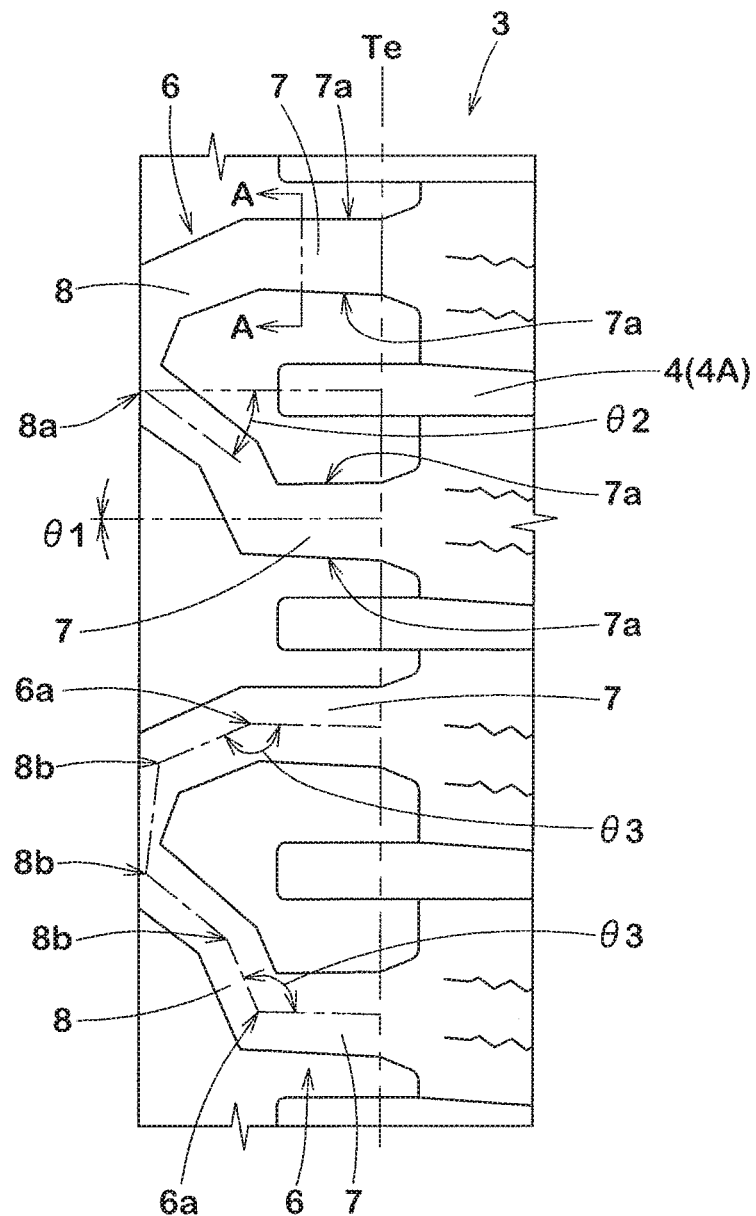
FIG. 3 is an enlarged view of the shoulder land portion.

FIG. 3 illustrates an enlarged development view of one of the shoulder land portions 3. As illustrated in FIG. 3, each first protrusion 7 preferably has an angle θ1 equal to or less than 10 degrees with respect to the tyre radial direction. In such first protrusions 7, side surfaces 7a of the first protrusions 7 enable to transmit force along a direction of traction effectively, improving traction performance on off-road of the tyre 1.

Each second protrusion 8 further includes at least one second bent portions 8b. In the present embodiment, three second bent portions 8b are provided in each second protrusion 8. The second protrusions 8 enable to generate traction at a location near the ground contact surface of the tread portion. Further, such second protrusions 8 enable to reduce volume thereof at a location far from the ground contact surface. Thus, the tyre 1 according to the present embodiment can exhibit improved traction performance on off-road as well as better tyre balance when high speed driving. In the present embodiment, each second protrusion 8, in a development view of the shoulder land portion, has an asymmetrical shape with respect to a groove centerline of a respective one of the shoulder lateral grooves 4.

It is preferable that the second protrusions 8 each have an angle of from 10 to 65 degrees with respect to the tyre radial direction at the first locations 8a. When the angle θ2 is less than 10 degrees, the angle difference of each second protrusion 8 with respect to each first protrusion 7 becomes small, traction by the first bent portions 6a may not be exhibited. Thus, there is a possibility that traction performance on off-road of the tyre 1 is not improved. When the angle θ2 is greater than 65 degrees, each second protrusion 8 may not transmit force along a direction of traction. Thus, there is a possibility that traction performance on off-road of the tyre 1 is not improved.

In the present embodiment, in each first bent portion 6a, an angle θ3 between the second protrusion 8 and the first protrusion 7 is an obtuse angle. It is preferable that the angle θ3 is of from 100 to 165 degrees. When the angle θ3 is less than 100 degrees, force in a direction of traction may not be transmitted, traction performance on off-road may not be improved. When the angle θ3 is greater than 165 degrees, traction by the first bent portions 6a may not be exerted. Thus, there is a possibility that traction performance on off-road of the tyre 1 is not improved.

Figure 4:
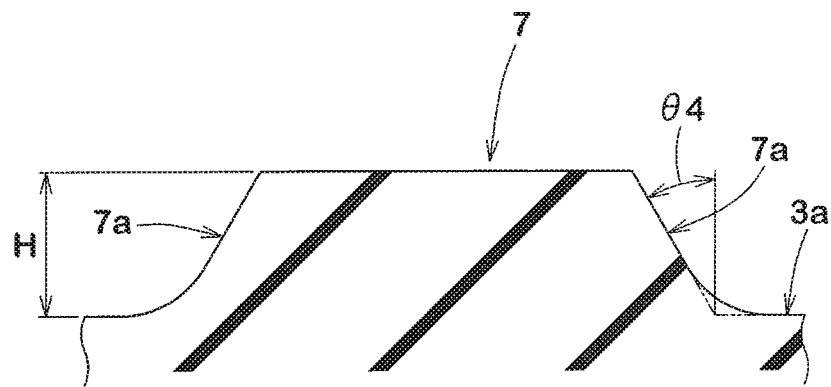
FIG. 4 is a cross-sectional view taken along line A-A of FIG. 3.

FIG. 4 illustrates a cross-sectional view taken along line A-A of FIG. 3. As illustrated in FIG. 4, in a tyre cross-section perpendicular to the outer surface 3a and along the tyre circumferential direction, a pair of side surfaces 7a of each first protrusion 7 is preferably inclined at an angle θ4 equal to or less than 45 degrees with respect to a normal line to the outer surface 3a. When the angle θ4 is greater than 45 degrees, force in a direction of traction may not be transmitted sufficiently, traction performance on off-road may not be improved. Note that a pair of side surfaces of each second protrusion 8 is also preferably inclined at the same as the angle θ4 of the pair of side surfaces 7a of each first protrusion 7, it is not illustrated though.

Preferably, each first protrusion 7 has a protruding height H in a range of from 1.5 to 5.0 mm from the outer surface 3a. When the protruding height H is less than 1.5 mm, force in a direction of traction may not be transmitted sufficiently, traction performance on off-road may not be improved. When the protruding height H is greater than 5.0 mm, volume of each first protrusion 7 becomes large, the tyre balance when high speed driving may not be improved. Note that a protruding height of each second protrusion 8 is also preferably same as the protruding height H of each first protrusion 7, it is not illustrated though.

As illustrated in FIG. 3, the protrusions 6 according to the present embodiment are not provided with any grooves nor sipes. Such protrusions 6 can suppress chipping and breaking thereof when driving on off-road to be caused by the sipes and the like, improving durability of the tyre 1. In addition, since the protrusions 6 according to the present embodiment have the first bent portions 6a and the second bent portions 8b, powerful traction can be generated even if no grooves and sipes are provided thereon.

As illustrated in FIG. 2, the outer surface 3a of each shoulder land portion 3 includes the plurality of side pockets 9 surrounded by the protrusions 6. Preferably, each side pocket 9 is formed in communication with a respective one of the shoulder lateral grooves 4. The side pockets 9 can generate powerful traction in cooperation with the shoulder lateral grooves 4 when the shoulder land portion 7 digs into off-road, improving traction performance on off-road of the tyre 1.

As illustrated in FIG. 1 and FIG. 2, it is preferable that each shoulder lateral groove 4 has a groove width increasing gradually outwardly in the tyre axial direction. Such shoulder lateral grooves 4, in cooperation with the pockets 9, can generate powerful traction when the shoulder land portion 7 digs into off-road, improving traction performance on off-road of the tyre 1. Further, the shoulder lateral grooves 4 according to the present embodiment can be helpful to reduce in volume of the shoulder blocks 5 on the tread edge side, improving tyre balance when high speed driving of the tyre 1.

The shoulder lateral grooves 4 according to the present embodiment include first shoulder lateral grooves 4A whose inner regions in the tyre radial direction are provided with the second protrusions 8 and second shoulder lateral grooves 4B whose inner regions in the tyre radial direction are not provided with the second shoulder lateral grooves 8. It is preferable that the first shoulder lateral grooves 4a and the second shoulder lateral grooves 4B are arranged alternately in the tyre circumferential direction. The shoulder land portion 3 having such shoulder lateral grooves 4 can be compatible high stiffness with light-weighted, thus enabling to be compatible high traction performance with tyre balance.

As illustrated in FIG. 1, the tread portion 2 according to the present embodiment is provided with two shoulder main grooves 10 which extend in the tyre circumferential direction continuously to define the shoulder land portions 3, and two crown main grooves 11 which extend in the tyre circumferential direction continuously between the shoulder main grooves 10 such that the tyre equator C is located therebetween. The shoulder main grooves 10 and the crown main grooves 11, for example, extend in a zigzag manner. In the present embodiment, the crown main grooves 11 each have zigzag amplitude in the tyre axial direction greater than zigzag amplitude in the tyre axial direction of the shoulder main grooves 10.

Each shoulder block 5 of the shoulder land portions 3 is provided with a plurality of (e.g. two in the present embodiment) shoulder sipes 14 which extends outwardly in the tyre axial direction from the shoulder main grooves 10 and terminates within the shoulder block 5. Such a shoulder block 5 can exhibit appropriate stiffness thereof by the shoulder sipes 14, improving traction performance of the tyre 1.

The shoulder blocks 5, for example, include first shoulder blocks 5A each of which includes a step portion 15 protruding into the shoulder main grooves 10, and second shoulder blocks 5B each of which is provided with a recess 16 recessed outwardly in the tyre axial direction from the shoulder main grooves 10. It is preferable that the first shoulder blocks 5A and the second shoulder blocks 5B are arranged alternately in the tyre circumferential direction.

Such shoulder blocks 5 can improve traction performance of the tyre 1 further since the step portions 15 and the recesses 16 can generate additional force in a direction of traction. Further, the step portions 15 and the recesses 16 according to the present embodiment improve stone-biting resistance of the tyre 1 since they help to discharge stones and the like to be engaged into the shoulder main grooves 10.

Each step portion 15, for example, extends from one of the shoulder lateral grooves 4 beyond one of the shoulder sipes 14 which is adjacent to the one of the shoulder lateral grooves 4 in the tyre circumferential direction. Such a step portion 15 can maintain appropriate stiffness of each shoulder block 5, improving traction performance of the tyre 1. Further, the step portions 15 according to the present embodiment are small in volume change in the tyre circumferential direction, the tyre balance when high speed driving of the tyre 1 can be improved.

Each recess 16, for example, is provided between two shoulder sipes 14 arranged in the tyre circumferential direction. Such a recess 16 can maintain appropriate stiffness of each shoulder block 5, improving traction performance of the tyre 1. Further, the recesses 16 according to the present embodiment are small in volume change in the tyre circumferential direction, the tyre balance when high speed driving of the tyre 1 can be improved.

Preferably, the tread portion 2 includes two middle land portions 12 each of which is defined between the adjacent shoulder main groove 10 and crown main groove 11, and a crown land portion 13 defined between the crown main grooves 11. In the present embodiment, the crown land portion 13 is disposed on the tyre equator C.

Figure 5:
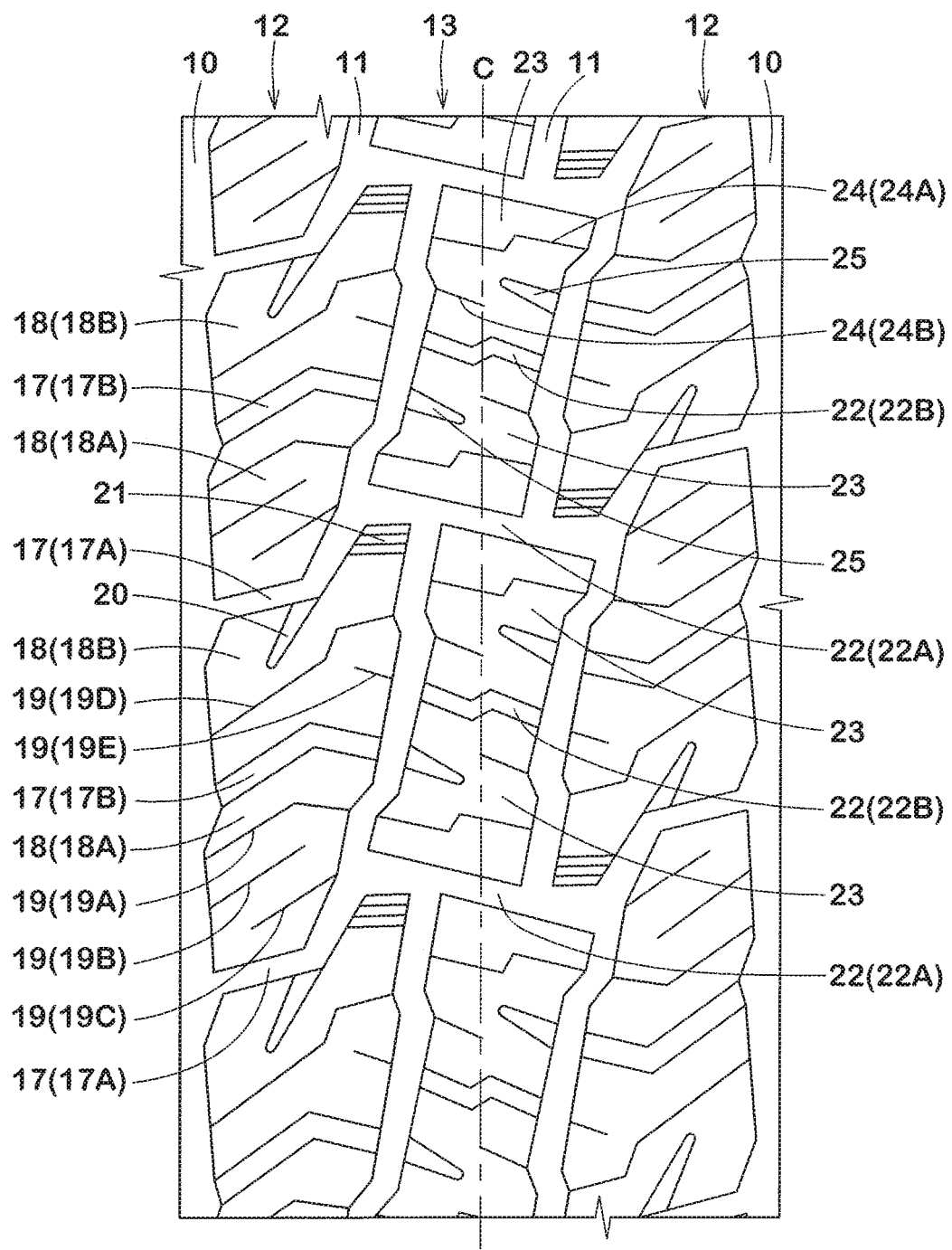
FIG. 5 is an enlarged view of a middle land portion and a crown land portion.

FIG. 5 illustrates an enlarged view of the middle land portions 12 and the crown land portion 13. As illustrated in FIG. 5, each middle land portion 12 according to the present embodiment is provided with middle lateral grooves 17 extending in the tyre axial direction from the shoulder main groove 10 to the crown main groove 11, and a plurality of the middle blocks 18 divided by the middle lateral grooves 17. The middle land portion 12 can generate powerful traction when the middle blocks 18 digs into off-road, improving traction performance on off-road of the tyre 1.

The middle lateral grooves 17, for example, include first middle lateral grooves 17A having a substantially same groove depth as the shoulder main grooves 10 and the crown main grooves 11, and second middle lateral grooves 17B having a shallower groove depth than that of the first middle lateral grooves 17A. It is preferable that the first middle lateral grooves 17A and the second middle lateral grooves 17B are arranged alternately in the tyre circumferential direction. Such middle land portions 12 having the middle lateral grooves 17 can be compatible high stiffness with light-weighted, thus enabling to be compatible high traction performance of the tyre 1 with better tyre balance.

The middle blocks 18, for example, include first middle blocks 18A provided with middle sipes 19, and second middle blocks 18B provided with middle sipes 19 and middle longitudinal grooves 20. It is preferable that the first middle blocks 18A and the second middle blocks 18B are arranged alternately in the tyre circumferential direction.

The middle sipes 19 according to the present embodiment include first middle sipes 19A, second middle sipes 19B and third middle sipes 19C each of which is provided on the first middle blocks 18A. Each first middle sipe 19A, for example, traverses the first middle block 18A completely in the tyre axial direction from the shoulder main groove 10 to the crown main groove 11. Each second middle sipe 19B, for example, extends in the tyre axial direction from the shoulder main groove 10 and terminates within the first middle block 18A. Each third middle sipe 19C, for example, extends outwardly in the tyre axial direction from the crown main groove 11 and terminates within the first middle block 18A. Such first middle blocks 18A can maintain appropriate stiffness thereof by employing various types of middle sipes 19, enabling to improve traction performance of the tyre 1.

The middle sipes 19 according to the present embodiment includes fourth middle sipes 19D and fifth middle sipes 19E each of which is provided on each second middle block 18B. Each fourth middle sipe 19D, for example, traverses the second middle block 18B completely in the tyre axial direction from the shoulder main groove 10 to the crown main groove 11. Each fifth middle sipe 19E, for example, extends outwardly in the tyre axial direction from the crown main groove 11 and terminate within the second middle block 18B. Such second middle blocks 18B can maintain appropriate stiffness by employing various types of middle sipes 19, enabling to improve traction performance of the tyre 1.

Each middle longitudinal groove 20 extends in the tyre circumferential direction from a respective one of first middle lateral grooves 17A and terminates within a respective one of the second middle blocks 18B. The middle longitudinal grooves 20 are preferably arranged such that each middle longitudinal groove 20 and an element of the first middle lateral groove 17A are aligned with one another. Further, the above-mentioned element of the first middle lateral groove 17A and an element of the crown main groove 11 are preferably aligned with one another. Such middle longitudinal grooves 20 can generate powerful traction in cooperation with the crown main grooves 11 and the middle lateral grooves 17 when the middle land portions 12 digs into off-road, improving traction performance on off-road of the tyre 1.

Preferably, the second middle blocks 18B is provided with step portions 21. The step portions 21, for example, are provided on the crown main groove 11 side of the second middle blocks 18B. The step portions 21 can maintain appropriate stiffness of the second middle blocks 18B, improving traction performance of the tyre 1. Further, the step portions 21 according to the present embodiment have a function to discharge stones and the like engaged into the crown main grooves 11, improving stone-biting resistance of the tyre 1.

The crown land portion 13 according to the embodiment is provided with crown lateral grooves 22 extending in the tyre axial direction connecting two crown main grooves 11 to define a plurality of crown blocks 23. The crown blocks 23 of crown land portion 13 can dig into off-road, improving traction performance of the tyre 1.

The crown lateral grooves 22, for example, include first crown lateral grooves 22A having a depth the same or substantially the same as the crown main grooves 11, and second crown lateral grooves 22B having a depth shallower than that of the first crown lateral grooves 22A. It is preferable that the first crown lateral grooves 22A and the second crown lateral grooves 22B are arranged alternately in the tyre circumferential direction. The crown land portion 13 having such crown lateral grooves 22 can be compatible high stiffness with light-weighted, and thus enabling to be compatible powerful traction performance of the tyre 1 with better tyre balance.

Each crown block 23, for example, is provided with a plurality of crown sipes 24, and one or more crown grooves 25 extending inwardly in the tyre axial direction from the crown main grooves 11 and terminating within the crown block 23. The crown blocks 23, due to the crown sipes 24 and the crown grooves 25, can maintain appropriate stiffness, improving traction performance of the tyre 1.

The crown sipes 24, for example, include at least one first crown sipe 24A extending in the tyre axial direction connecting two crown main grooves 11, and at least one second crown sipe 24B extending inwardly in the tyre axial direction from either one of the crown main grooves 11 and terminating within the crown block 23. Such a crown block 23, due to various types of crown sipes 24, can maintain appropriate stiffness, improving traction performance of the tyre 1.

The crown grooves 25, for example, are located on extension lines of the second middle lateral grooves 17B. Such crown grooves 25 can generate powerful traction in cooperation with the second middle lateral grooves 17B when digging into off-road, improving traction performance on off-road of the tyre 1.

While the particularly preferred embodiments in accordance with the disclosure have been described in detail above, the present disclosure is not limited to the above embodiments but can be modified and carried out in various aspects within the scope of the disclosure.

Example

Tyres having a basic tread pattern shown in FIG. 1 were manufactured by way of trial based on Tables 1 and 2. Then, traction performance on off-road, tyre balance on high speed driving, and durability for these tyres were tested. The common specification and the test procedure are as follows.
Common Specification
  Tyre size: 225/65R17
  Rim size: 17×6.5 J
  Inner pressure: 230 kPa
Traction Performance Test:
  A test driver drove a test vehicle (a middle size four-wheel drive vehicle) with four wheels equipped with the respective test tyres on snowy road, and then evaluated traction and braking performance by the driver's sense. The test results are shown in Tables 1 and 2 using an index, wherein Ref. 1 is set to 100. The larger the value, the better the traction performance is.

Tyre Balance Test:

A dynamic balance value of each test tyre was measured using a balancer. The test results are shown in Tables 1 and 2 using an index, wherein Ref. 1 is set to 100. The larger value indicates the smaller dynamic balance value, thus showing better tyre balance.

Durability Test:

Each test tyre was mounted to a drum tester to measure a runnable distance until at least one of the shoulder blocks breaks. The test results are shown in Tables 1 and 2 using an index, wherein Ref. 1 is set to 100. The larger the value, the better the durability is.

Tables 1 and 2 show the test results.

TABLE 1

|  | Ref. 1 | Ref. 2 | Ref. 3 | Ex. 1 | Ex. 2 | Ex. 3 | Ex. 4 | Ex. 5 |
| --- | --- | --- | --- | --- | --- | --- | --- | --- |
| First protrusion widths W1/shoulder block maximum lengths L (%) | 100 | 30 | 100 | 30 | 20 | 50 | 30 | 30 |
| Second protrusion widths W2/first protrusion widths (%) | 100 | 100 | 30 | 60 | 60 | 60 | 40 | 80 |
| First protrusion angle $\theta_1$ (deg.) | 0 | 0 | 0 | 0 | 0 | 0 | 0 | 0 |
| Second protrusion angle $\theta_2$ at first location (deg.) | 90 | 45 | 45 | 45 | 45 | 45 | 45 | 45 |
| Protruding height H (mm) | 3.0 | 3.0 | 3.0 | 3.0 | 3.0 | 3.0 | 3.0 | 3.0 |
| Sipe on protrusions | none | none | none | none | none | none | none | none |
| Shoulder lateral grooves groove width shape | gradually increasing | gradually increasing | gradually increasing | gradually increasing | gradually increasing | gradually increasing | gradually increasing | gradually increasing |
| Traction performance (index) | 100 | 102 | 102 | 105 | 103 | 105 | 103 | 105 |
| Tyre balance (index) | 100 | 102 | 101 | 105 | 107 | 102 | 106 | 103 |
| Durability (index) | 100 | 100 | 100 | 100 | 96 | 100 | 99 | 100 |

TABLE 2

|  | Ex. 6 | Ex. 7 | Ex. 8 | Ex. 9 | Ex. 10 | Ex. 11 |
| --- | --- | --- | --- | --- | --- | --- |
| First protrusion widths W1/shoulder block maximum lengths L (%) | 30 | 30 | 30 | 30 | 30 | 30 |
| Second protrusion widths W2/first protrusion widths (%) | 60 | 60 | 60 | 60 | 60 | 60 |
| First protrusion angle $\theta_1$ (deg.) | 10 | 0 | 0 | 0 | 0 | 0 |
| Second protrusion angle $\theta_2$ at first location (deg.) | 45 | 65 | 45 | 45 | 45 | 45 |
| Protruding height H (mm) | 3.0 | 3.0 | 1.5 | 5.0 | 3.0 | 3.0 |
| Sipe on protrusions | none | none | none | none | Presence | none |
| Shoulder lateral grooves groove width shape | gradually increasing | gradually increasing | gradually increasing | gradually increasing | gradually increasing | constant |
| Traction performance (index) | 102 | 103 | 102 | 110 | 108 | 103 |
| Tyre balance (index) | 105 | 105 | 108 | 100 | 100 | 103 |
| Durability (index) | 100 | 100 | 100 | 99 | 97 | 100 |

From the test results, it is confirmed that the tyres of examples are compatible traction performance on off-road and tyre balance on high speed driving while maintaining the same durability as the reference tyres.

What is claimed is:

1. A tire comprising:

a tread portion comprising a shoulder land portion, the shoulder land portion having a tread edge and an outer surface in a tire axial direction extending inwardly in a tire radial direction from the tread edge, the shoulder land portion being provided with shoulder lateral grooves extending inwardly in the tire axial direction from the tread edge to define shoulder blocks therebetween, and protrusions protruding outwardly in the tire axial direction from the outer surface of the shoulder land portion, the protrusions comprising first protrusions provided on the respective shoulder blocks and extending in the tire radial direction, and second protrusions connecting inner ends in the tire radial direction of adjacent two first protrusions in a tire circumferential direction such that first bent portions are formed between the second protrusions and the first protrusions, wherein the first protrusions have widths smaller than maximum length in the tire circumferential direction of the respective shoulder blocks, wherein the second protrusions have widths smaller than the width of the first protrusions, each second protrusion further comprising at least one second bent portion, and wherein the at least one second bent portion comprises a plurality of second bent portions.

2. The tire according to claim 1, wherein the widths of the second protrusions at first locations located inwardly of the respective shoulder lateral grooves in the tire radial direction are in a range of from 40% to 80% of the widths of the first protrusions.

3. The tire according to claim 2, wherein the second protrusions each have an angle of from 10 to 65 degrees with respect to the tire radial direction at the first locations.

4. The tire according to claim 1,
wherein in each first bent portion, an angle between the second protrusion and the first protrusion is an obtuse angle.

5. The tire according to claim 1,
wherein the widths of the first protrusions are each in a range of from 20% to 50% of the maximum widths in the tire circumferential direction of the respective shoulder blocks.

6. The tire according to claim 1,
wherein an angle of each first protrusion is equal to or less than 10 degrees with respect to the tire radial direction.

7. The tire according to claim 1,
wherein in a tire cross-section perpendicular to the outer surface of the shoulder land portion and along the tire circumferential direction, a pair of side surfaces of each first protrusion is inclined at an angle equal to or less than 45 degrees with respect to a normal line to the outer surface of the shoulder land portion.

8. The tire according to claim 1,
wherein each protrusion has a protruding height in a range of from 1.5 to 5.0 mm from the outer surface of the shoulder land portion.

9. The tire according to claim 1,
wherein the protrusions are not provided with any grooves nor sipes.

10. The tire according to claim 1,
wherein the shoulder lateral grooves comprise first shoulder lateral grooves whose inner regions in the tire radial direction are provided with the second protrusions, and second shoulder lateral grooves whose inner regions in the tire radial direction are not provided with the second protrusions, and
wherein the first shoulder lateral grooves and the second shoulder lateral grooves are arranged alternately in the tire circumferential direction.

11. The tire according to claim 1,
wherein each shoulder lateral groove has a groove width increasing gradually outwardly in the tire axial direction.

12. The tire according to claim 1,
wherein each first protrusion extends outwardly in the tire radial direction to the tread edge.

13. The tire according to claim 1,
wherein the at least one second bent portion comprises three second bent portions.

14. The tire according to claim 1,
wherein each second protrusion, in a development view of the shoulder land portion, has an asymmetrical shape with respect to a groove centerline of a respective one of the shoulder lateral grooves.

15. The tire according to claim 1,
wherein the widths of the first protrusions are greater than groove widths of the shoulder lateral grooves.

16. The tire according to claim 1,
wherein each second protrusion has a minimum width smaller than groove widths of the shoulder lateral grooves.

17. The tire according to claim 2,
wherein in each first bent portion, an angle between the second protrusion and the first protrusion is an obtuse angle.

18. The tire according to claim 3,
wherein in each first bent portion, an angle between the second protrusion and the first protrusion is an obtuse angle.

* * * * *